United States Patent
Piper et al.

(10) Patent No.: US 11,316,456 B2
(45) Date of Patent: Apr. 26, 2022

(54) SYSTEMS AND METHODS FOR OPTIMIZING ENGINE OPERATIONS IN GENSETS

(71) Applicant: Cummins Inc., Columbus, IN (US)

(72) Inventors: Erik L. Piper, Columbus, IN (US); Martin T. Books, Columbus, IN (US); Richard A. Booth, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/979,741

(22) PCT Filed: Mar. 11, 2019

(86) PCT No.: PCT/US2019/021632
§ 371 (c)(1),
(2) Date: Sep. 10, 2020

(87) PCT Pub. No.: WO2019/177979
PCT Pub. Date: Sep. 19, 2019

(65) Prior Publication Data
US 2021/0044230 A1    Feb. 11, 2021

Related U.S. Application Data

(60) Provisional application No. 62/642,995, filed on Mar. 14, 2018.

(51) Int. Cl.
*H02P 9/04* (2006.01)
*F02D 41/04* (2006.01)
(Continued)

(52) U.S. Cl.
CPC ........... *H02P 9/04* (2013.01); *F02B 63/042* (2013.01); *F02D 29/06* (2013.01); *F02D 41/04* (2013.01);
(Continued)

(58) Field of Classification Search
CPC ...... H02P 9/04; H02P 2101/25; F02B 63/042; F02D 29/06; F02D 41/04;
(Continued)

(56) References Cited

U.S. PATENT DOCUMENTS 6,823,840 B1 * 11/2004 Tamai ................. B60K 6/48
123/352
8,620,500 B2    12/2013 Becker et al.
(Continued)

FOREIGN PATENT DOCUMENTS

WO    WO-2012/135258 A2    10/2012

OTHER PUBLICATIONS

International Search Report and Written Opinion for International Application No. PCT/US2019/021632, dated May 1, 2019, 11 pages.

*Primary Examiner* — George C Jin
(74) *Attorney, Agent, or Firm* — Foley & Lardner LLP

(57) ABSTRACT

A system comprises a generator and an engine coupled thereto. The engine is configured to provide mechanical power to the generator. A controller is coupled to the engine and the generator and is configured to compare an engine operating parameter value to a load demand value indicative of a load exerted by the generator on the engine. The controller determines that the engine operating parameter value fails to match the load demand value. The controller determines an engine operating parameter threshold value at which the engine operating parameter value failed to match the load demand value, and sets the engine operating parameter threshold value as a maximum allowable engine operating parameter value for the engine.

20 Claims, 5 Drawing Sheets

(51) Int. Cl.
*F02B 63/04* (2006.01)
*F02D 29/06* (2006.01)
*H02P 101/25* (2016.01)

(52) U.S. Cl.
CPC .................. *F02D 2200/101* (2013.01); *F02D 2200/1002* (2013.01); *H02P 2101/25* (2015.01)

(58) Field of Classification Search
CPC ...... F02D 2200/1002; F02D 2200/101; B60W 20/13; B60W 20/06; B60W 20/10; B60W 10/06; B60W 10/04; B60W 10/08
See application file for complete search history.

(56) References Cited

U.S. PATENT DOCUMENTS

| | | | |
|---|---|---|---|
| 8,688,356 B2 | 4/2014 | Watanabe et al. | |
| 9,145,135 B2 | 9/2015 | Sugimoto | |
| 9,440,655 B2 | 9/2016 | Roos et al. | |
| 2002/0063002 A1* | 5/2002 | Lasson .................. | B60W 20/10 180/65.235 |
| 2006/0220387 A1* | 10/2006 | Tsuzuki .................... | H02P 9/04 290/52 |
| 2009/0096431 A1* | 4/2009 | Verschuur ................ | H02P 9/06 322/8 |
| 2009/0261599 A1* | 10/2009 | Alston ...................... | H02P 9/04 290/40 B |
| 2010/0106389 A1 | 4/2010 | Fore et al. | |
| 2010/0148588 A1* | 6/2010 | Algrain ..................... | H02P 9/04 307/84 |
| 2010/0235066 A1* | 9/2010 | Hill ........................ | F02D 41/021 701/102 |
| 2011/0204654 A1* | 8/2011 | Hansen ................... | F02B 33/38 290/1 R |
| 2012/0306457 A1 | 12/2012 | Haggerty et al. | |
| 2014/0121947 A1 | 5/2014 | Komuro | |
| 2014/0188319 A1* | 7/2014 | Ohno ........................ | H02P 9/04 701/22 |
| 2014/0265353 A1* | 9/2014 | Yu ........................ | B60L 15/2045 290/40 B |
| 2016/0011569 A1 | 1/2016 | Schultz | |
| 2016/0280211 A1* | 9/2016 | Lian ...................... | B60W 10/02 |
| 2016/0297421 A1 | 10/2016 | Ahn et al. | |

* cited by examiner

SYSTEMS AND METHODS FOR OPTIMIZING ENGINE OPERATIONS IN GENSETS

CROSS-REFERENCE TO RELATED APPLICATION

The present application claims priority to and benefit of U.S. Provisional Application No. 62/642,995, filed Mar. 14, 2018, and entitled "Systems and Methods for Optimizing Engine Operations in Gensets," which is incorporated herein by reference herein in its entirety and for all purposes.

TECHNICAL FIELD

The present disclosure relates generally to control systems for preventing stalling in engines included in or with generator sets ("gensets").

BACKGROUND

Gensets such as those used in electrified vehicles include an engine coupled to a generator. The generator produces electricity when driven by the engine. Such gensets may be used, for example in hybrid vehicles in which the genset provides intermittent power to drive the vehicle along with a power source (e.g., batteries), or may be used in electric vehicles in range extender electric vehicles (REEV) as an on board source of electrical generation configured to provide electrical power to the vehicle once the primary power source starts to run low. The engine is generally matched to the generator so that the engine can match the load demand exerted by the generator on the engine.

Generally, the engines included in gensets have more variation in power production than the generator. For example, a genset may be matched during calibration using a particular engine and generator combination, but when the genset is installed in a system (e.g., a vehicle), a different engine (e.g., a different engine of the same model) is used which may be mismatched with the generator. Furthermore, the engine may have been calibrated to match the generator up to a certain load demand, but due to wear-and-tear during operation, or because of environmental conditions, the engine may become mismatched from the generator. In such instances, the engine may be unable to match the load demand exerted on it by the generator. If the load demand exerted by the generator on the engine exceeds the power which the engine can produce, the engine may stall or lug and eventually shut down. Therefore, gensets are often controlled so as to provide a large buffer between the actual rated power of the engine (e.g., 150 kW) and the load demand that the generator may exert on the engine (e.g., 130 kW) so as to accommodate any mismatch and prevent lugging and stalling. However, this often results in the engine being used below the actual power that the engine may be capable of providing to the generator, thereby reducing the performance of the genset, and the system (e.g., a vehicle) including the genset.

SUMMARY

Embodiments described herein relate generally to systems and methods for preventing stalling and/or lugging in an engine coupled to a generator. Particularly, systems and methods described herein are configured to dynamically determine an engine operating parameter threshold value corresponding to a load demand value exerted by the generator on the engine at which the engine starts to stall, and set the value as a maximum allowable engine operating parameter value.

In some embodiments, a system comprises a generator, and an engine coupled to the generator. The engine is configured to provide mechanical power to the generator. A controller is coupled to the engine and the generator. The controller is configured to compare an engine operating parameter value to a load demand value indicative of a load exerted by the generator on the engine. The controller is configured to determine that the engine operating parameter value fails to match the load demand value. The controller is configured to determine an engine operating parameter threshold value at which the engine operating parameter value failed to match the load demand value. The controller is further configured to set the engine operating parameter threshold value as a maximum allowable engine operating parameter value for the engine.

In some embodiments, a control system for a genset including an engine and a generator, comprises: a controller configured to be coupled to each of the engine and the generator, the controller configured to: compare an engine operating parameter value to a load demand value indicative of a load exerted by the generator on the engine; determine that the engine operating parameter value fails to match the load demand value; determine an engine operating parameter threshold value at which the engine operating parameter value failed to match the load demand value; and set the engine operating parameter threshold value as a maximum allowable engine operating parameter value for the engine.

In some embodiments, a method for controlling a genset comprising an engine and a generator, comprises: comparing an engine operating parameter value to a load demand value indicative of a load exerted by the generator on the engine; determining that the engine operating parameter value fails to match the load demand value; determining engine operating parameter threshold value at which the engine operating parameter value failed to match the load demand value; and setting the engine operating parameter threshold value as a maximum allowable engine operating parameter value for the engine.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

Figure 1:
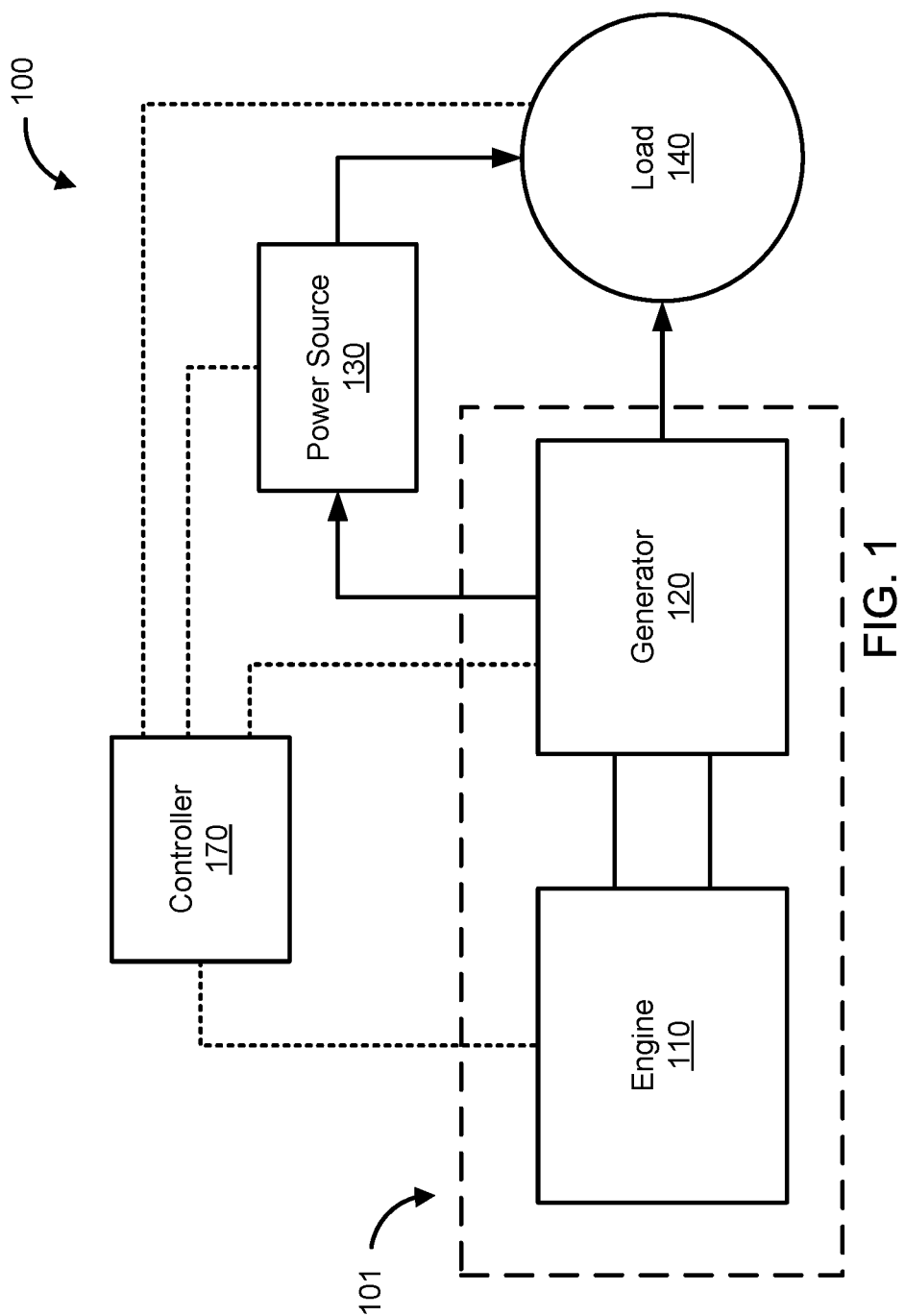
FIG. 1 is a schematic illustration of a system comprising a genset including an engine, a generator and a controller, according to an embodiment.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for preventing stalling and/or lugging in an engine coupled to a generator. Particularly, systems and methods described herein are configured to dynamically determine an engine operating parameter threshold value corresponding to a load demand value exerted by the generator on the engine at which the engine starts to stall, and set the value as a maximum allowable engine operating parameter value.

Various embodiments of the systems and methods described herein may provide benefits including, for example: (1) providing real time determination of a maximum allowable engine operating parameter (e.g., speed, torque, power, etc.) that may be drawn from an engine by a generator coupled thereto; (2) preventing stalling of the engine by preventing the engine from going above the maximum allowable engine operating parameter; (3) eliminating the use of a large buffer between engine power and load used in conventional engines, by allowing the engine to be operated up to the maximum allowable engine operating parameter value; and (4) maximizing power output from the engine, thereby improving performance of the genset and a system (e.g., a vehicle) including the genset.

FIG. 1 is a schematic illustration of a system 100 including a genset 101, a power source 130 and a load 140. The system 100 may be an electrified vehicle (e.g., a hybrid vehicle, a plug-in-hybrid vehicle, a REEV, etc.). In other embodiments, the system 100 may be an electrical power production system, for example, a backup grid power generation system or a portable power generation system (e.g., a residential backup power generation system). The genset 101 includes an engine 110, a generator 120, and a controller 170 operably coupled to each of the engine 110 and the generator 120. The genset 101 may be configured to generate back-up power so as to provide power to the power source 130 and/or the load 140 in the event that a capacity of the power source 130 decreases below a low capacity threshold. In some embodiments, the system 100 includes a REEV which is designed to primarily operate on electric power. For example, the system 100 may be an on-road or an off-road vehicle including, but not limited to, line-haul trucks, mid-range trucks (e.g., pick-up truck), cars (e.g., sedans, hatchbacks, coupes, etc.), buses, vans, refuse vehicles, delivery trucks, motorbikes, three wheelers, and any other type of vehicle structured to use electric power as the main electromotive force to drive its wheels. Thus, the present disclosure is applicable with a wide variety of implementations.

The power source 130 may be configured to store and provide electric power to the load 140 which may include, for example one or more DC motors included in the system 100. For example, the system 100 may include an REEV, and the load 140 may include one or more DC motors coupled to wheels included in the REEV. The power source 130 may include a battery such, as for example a lithium-ion battery, a lithium-air battery, a lithium-sulfur battery, a sodium-ion battery or any other electric power source.

The engine 110 is coupled to the generator 120, and configured to provide mechanical power to the generator 120, for example, in response to a load demand by the generator 120 from the engine 110. The engine 110 may include an internal combustion ("IC") engine which converts fuel (e.g., diesel, gasoline, natural gas, biodiesel, ethanol, liquid petroleum gas or any combination thereof.) into mechanical energy. The engine 110 may include a plurality of piston and cylinders pairs (not shown) for combusting the fuel to produce mechanical energy. Furthermore, the engine 110 may be coupled to the generator 120 via a shaft so as to provide mechanical power thereto in response to the load demand exerted on the engine 110 by the generator 120.

The generator 120 may include an alternator, for example a wound rotor or permanent magnet alternator configured to convert a rotational mechanical power produced by the engine 110 into electrical energy. The generator 120 is configured to produce an electrical output. The electrical output can include a voltage and/or a current, and is proportion to the speed or torque provided by the engine 110 to the generator 120. The generator 120 is configured to exert a load demand on the engine 110, for example based on a load demand (e.g., power, speed or torque) demanded by the load 140 and/or power source 130 from the generator 120.

Expanding further, in some instances a capacity of the power source 130 (e.g., an amount of electrical charge stored in the power source 130) may drop below a low capacity threshold. The load 140 and/or the power source 130 may request the generator 120 (e.g., via the controller 170 described below in further detail herein) to generate electrical power based on a load requirement from the power source 130 and/or the load 140. The generator 120 exerts a load demand on the engine 110 causing the engine 110 to activate (e.g., turn ON or start). For example, the engine 110 may initially be in a deactivated state (e.g., turned OFF). The controller 170 may communicate an activation signal to the engine 110 based on the load needed from the generator 120 causing the engine 110 to activate (e.g., turn ON or start) which in turn drives the generator 120 so as to produce electrical power corresponding to the load demand.

The engine 110 adjusts an engine operating parameter thereof (e.g., via the controller 170) so as to match the load demand exerted by the generator 120 thereon. The load demand may include, for example, a mechanical power requested by the generator 120 from the engine 110, and the engine operating parameter may include, for example an engine speed, an engine torque or otherwise, engine power produced by the engine 110 corresponding to the load demand. For example, a user driving a vehicle including system 100 when the power source 130 is discharged, may accelerate the vehicle and increase a load demand on the generator 120, thereby causing the generator 120 to exert an increasing load demand on the engine 110.

As used herein, the term "match," or "matching" implies that a power, a speed, a torque and/or an efficiency of the engine 120 is within a predefined range (e.g., as defined by the controller 170) of a power, a speed, a torque, an efficiency, a voltage and/or current that the generator 120 may have to produce at so as to meet the load demand (e.g., the electrical power corresponding to the load demand that generator 120 may have to produce). For example, the generator 120 may have to produce a power of 100 W based on a load demand, and the engine 110 would be matched with the generator 120 if a power produced by the engine 110 is within +5% of the corresponding power that the generator 120 should produce (i.e., in a range of 95 kW to 105 kW). Similarly, the generator 120 may have to be driven at 100 rpm to produce an electrical power corresponding to a load demand, and the engine 110 would be matched with the generator 120 if a speed of the engine 110 is within +5% of the speed that the generator 120 should be driven at (i.e., in a range of 95 rpm to 105 rpm).

Alternatively, the genset 101 may be rated at a particular power factor. Power factor is defined as the ratio of real power (kW) (i.e., a power produced by the engine 110) to apparent power (kVA) (i.e., a power produced by the generator 120), and is a number between 0 and 1. Thus, a 0.8 power factor implies that the genset 120 producing 100 kVA of electrical power corresponds to the engine 110 producing 80 KW of real power. The engine 110 and generator 120 may be "matched" if the actual power factor of the genset 101 is within +5% (e.g., in a range of 0.75 to 0.85) of the rated power factor of the genset 101 (e.g., 0.8).

In some instances, the engine 110 may be mismatched from the generator 120 such that the engine 110 has at least one of a peak torque, peak power or peak speed which is less than (e.g., less than 95%) at least one of a peak torque, peak power or peak speed, respectively of the generator 120. For example, the engine 110 may be rated at a lower power than the generator 120, may be different than an engine that the generator 120 was originally matched with, or may have become mismatched from the generator 120 due to wear-and-tear. As used herein, the term "mismatch" implies that at least under some conditions, the engine 110 is not able to match, cope or otherwise provide mechanical energy or power to match a load demand value (e.g., an amount of power) required by the generator 120 from the engine 110, thereby possibly leading to stalling or lugging of the engine 110, unwanted wear and tear and generally inefficient operation of the engine. The engine 110 may be "mismatched" with the generator 120 when one or more of the match criteria are not met. For example, at certain load demands, the genset 101 may have an actual power factor which is beyond an acceptable range of the rated power factor of the genset 101 (e.g., lower than 0.75 or higher than 0.85 for a rated power factor of 0.8). A leading power factor below 0.75 may result in the engine 110 having surplus real power to power the generator 120 in excess of its 100% kVA rating. Similarly, a lagging power factor above 0.8 results in the engine 110 not having sufficient real power to power the generator 120 to 100% of its kVA rating, which may lead to stalling, lugging, or premature stopping of the engine 110.

As shown in FIG. 1, the controller 170 is coupled to the engine 110 and the generator 120. In some embodiments, the controller 170 may also be coupled to the power source 130 and/or the load 140. For example, the controller 170 may be configured to determine the capacity of the power source 130, and activate (e.g., turn ON) the engine 110 when the capacity of the power source 130 decreases below the low capacity threshold. Furthermore, the controller 170 may also be configured to deactivate (e.g., turn OFF) the engine 110 when the capacity of the power source 130 reaches a high capacity threshold (e.g., the power source 130 is fully charged). The controller 170 may be configured to determine a load demand exerted by the load 140 on the generator 120. In particular embodiments, the controller 170 may be coupled to a central controller (not shown) configured to control the overall operation of the system 100. In such embodiments, the controller 170 may activate or deactivate the engine 110 based on an input from the central controller.

The controller 170 may be operably coupled to the engine 110, the generator 120, the power source 130, the load 140 and/or any other components of the system 100 using any type and any number of wired or wireless connections. For example, a wired connection may include a serial cable, a fiber optic cable, a CATS cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections. Because the controller 170 is communicably coupled to the systems and components of the system 100 as shown in FIG. 1, the controller 170 is structured to receive data regarding one or more of the components shown in FIG. 1. For example, the data may include an engine operating parameter value from the engine 110 (e.g., an amount of speed, power, torque or any other suitable engine operating parameter), a load demand value exerted by the generator 120 on the engine 110 (e.g., an amount of power demanded by the generator 120 from engine 110), a capacity of the power source 130 and/or the load demand exerted by the load 140 on the generator 120. The controller 170 may determine how to control the engine 110 and/or the generator 120 based on the operation data, as described herein.

The controller 170 is configured to dynamically (e.g., while the generator 120 and the engine 110 are operating in real time or substantially real time) determine an engine operating parameter threshold value corresponding to a load demand value exerted by the generator 120 on the engine 110, at which the engine 110 starts to stall, lug or otherwise an operation thereof is adversely affected, and set the value as a maximum allowable engine operating parameter value. Expanding further, the controller 170 is configured to compare an engine operating parameter value to a load demand value corresponding to the load demand. The engine operating parameter value is configured to adjust so as to match the load demand value as the load demand value changes over time.

For example, the engine operating parameter value may include a value of the speed, torque or power of the engine 110 and the load demand value may include a value of a power demand exerted by the generator 120 on the engine 110 (e.g., based on the power required by the load 140). The controller 170 may include algorithms or lookup tables configured to compare the engine operating parameter value (e.g., engine speed) to the load demand value (e.g., power demand) and adjust the engine operating parameter value to match the load demand value as the load demand value changes over time (e.g., increases or decreases).

The controller 170 is configured to determine that the engine operating parameter value fails to match the load demand value. For example, the load demand exerted by the generator 120 on the engine 110 may continue to increase and the controller 170 may be configured to adjust (e.g., increase) the engine operating parameter value so as to match the load demand value (e.g., increase the speed of the engine 110 to increase a power output of the engine 110 so as to match the power required by the generator 120 therefrom) until the engine 110 reaches a limit. Any further increase in the load demand value may not result in a corresponding increase in the engine operating parameter value, and may actually cause the engine operating parameter value to decrease (e.g., the engine speed may start to decrease) indicative of the engine 110 stalling or lugging (e.g., an unusually sudden drop in engine 110 speed and/or torque).

The controller 170 is configured to determine an engine operating parameter threshold value corresponding to the load demand value at which the engine parameter value failed to match the load demand value. For example, the controller 170 may store (e.g., in the memory 173 as described with respect to FIG. 2) the maximum value of the engine operating parameter (e.g., maximum speed) that the engine 110 was able to achieve to match the load demand value, and any further increase in the load demand value caused the engine operating value to remain the same or decrease thereafter. As previously described herein, the load demand value being greater than the engine operating parameter threshold value corresponds to the engine 110 stalling, and the controller 170 may be configured to turn OFF or shut OFF the engine 110 in response to the load demand value being greater than the engine operating parameter threshold value to prevent the engine 110 from stalling.

Furthermore, the controller 170 may be configured to set the engine operating parameter threshold value as a maximum allowable engine operating parameter value for the engine 110. In other words, the controller 170 sets an upper limit for the engine operating parameter value corresponding to an actual power output that the engine 110 is capable of producing. This allows more power to be drawn from the engine 110 in contrast to conventional gensets that employ a pre-defined upper limit by providing a large buffer between the load demand value and the engine operating parameter value, which prevents the engine 110 from being pushed to its maximum capability. In particular embodiments, the controller 170 may also be configured to maintain the engine operating parameter value below the engine operating parameter threshold value so as to prevent lugging or stalling of the engine 110.

In particular embodiments, the controller 170 may be further configured to determine a load demand threshold value corresponding to the engine operating parameter value at which the engine operating parameter value failed to match the load demand value. For example, the controller 170 may determine a specific load demand value at which the engine operating parameter value started mismatching (e.g., immediately or within a short time period such as less than 5 seconds) from the load demand value (e.g., subsequent increase in load demand value did not cause a corresponding increase, or resulted in decrease of the engine operating parameter value), and store the value as the load demand threshold value in the memory thereof (e.g., the memory 173). The controller 170 may set the load demand threshold value as a maximum allowable load demand value for the generator 120, for example, the maximum power draw the generator 120 may exert on the engine 110. In some embodiments, the controller 170 is also configured to maintain the load demand value below the load demand threshold value. In other words, the controller 170 may prevent the generator 120 from exerting a load demand value on the engine 110, which is greater than the engine operating parameter threshold, so as to prevent lugging or stalling of the engine 110.

In some embodiments, the controller 170 may be configured to determine and set the engine operating parameter threshold value and/or the load demand threshold value during an initial run (e.g., a calibration run, a test run, or a first operational run) of the genset 101 in the system 100. In other embodiments, the controller 170 may be configured to periodically determine and update the engine operating parameter threshold value and/or the load demand threshold value over the life of the system 100. For example, the controller 170 may determine and update the engine operating parameter threshold value and/or the load demand threshold value at each maintenance interval or any other predetermined interval, so as to accommodate for degradation (e.g., due to wear-and-tear) or enhancement (e.g., due to modifications such as installation of a turbocharger or supercharger) in the performance of the engine 110. In this manner, the controller 170 may enable maximum power to be drawn from the engine 110 by the generator 120 based on an actual performance capability of the engine 110, rather than a pre-defined limit.

Figure 2:
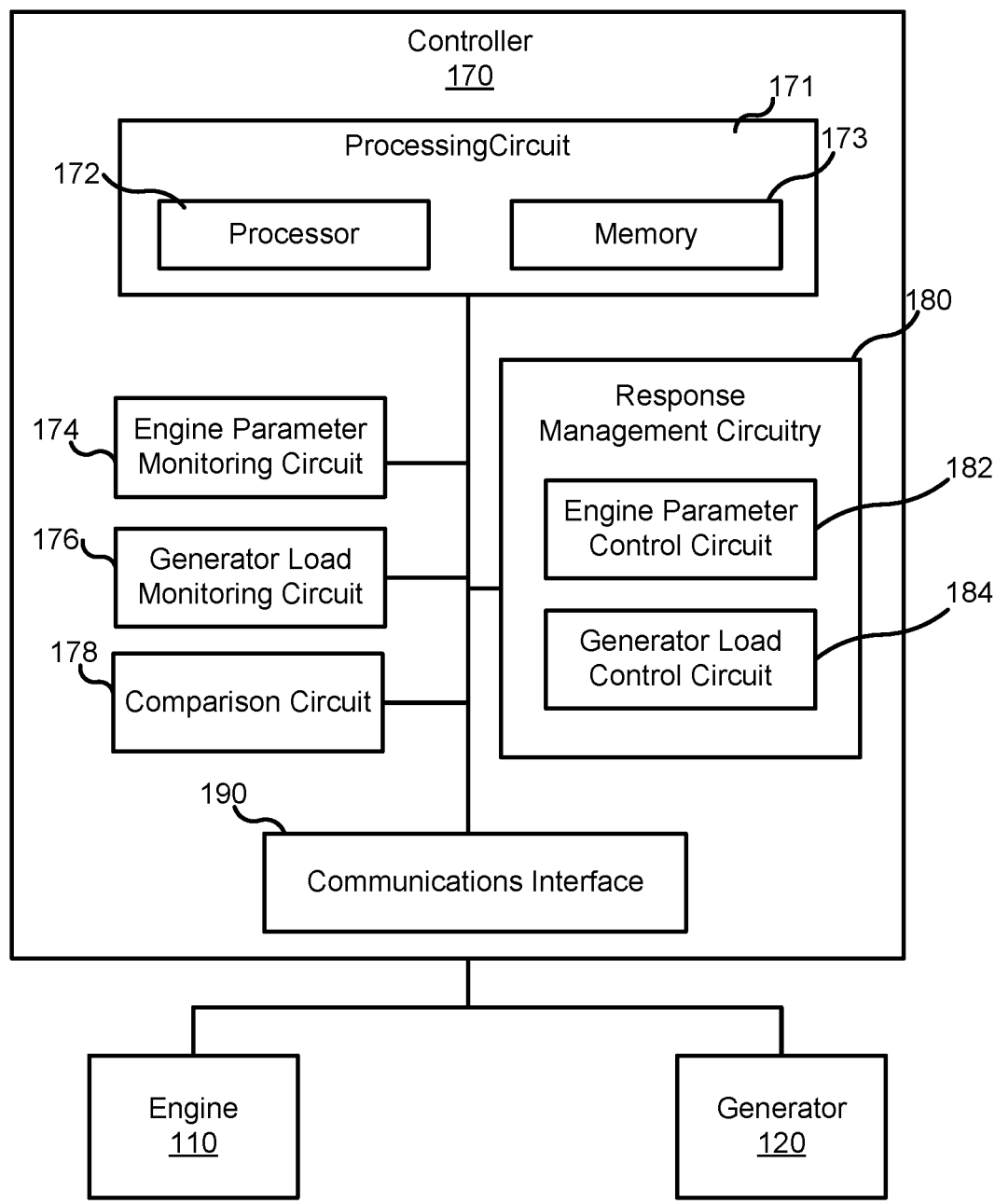
FIG. 2 is a schematic block diagram of the controller of FIG. 1, according to an embodiment.

In various embodiments, the controller 170 may comprise an electronic control unit configured to receive various signals from the engine 110, the generator 120 and optionally, the power source 130 and the load 140. As shown in FIG. 2, the controller 170 may include a processing circuit 171 having a processor 172 and a memory 173, an engine parameter monitoring circuit 174, a generator load monitoring circuit 176, a comparison circuit 178 and a communications interface 190. The controller 170 may also include a response management circuitry 180 having an engine parameter control circuit 182 and a generator load control circuit 184.

The processor 172 may comprise a microprocessor, programmable logic controller (PLC) chip, an ASIC chip, or any other suitable processor. The processor 172 is in communication with the memory 173 and configured to execute instructions, algorithms, commands, or otherwise programs stored in the memory 173. The memory 173 may comprise any of the memory and/or storage components discussed herein. For example, memory 173 may comprise a RAM and/or cache of processor 172. The memory 173 may also comprise one or more storage devices (e.g., hard drives, flash drives, computer readable media, etc.) either local or remote to the controller 170. The memory 173 is configured to store look up tables, algorithms, or instructions.

In one configuration, the engine parameter monitoring circuit 174, the generator load monitoring circuit 176, the comparison circuit 178, and the response management circuitry 180 are embodied as machine or computer-readable media (e.g., stored in the memory 173) that is executable by a processor, such as the processor 172. As described herein and amongst other uses, the machine-readable media (e.g., the memory 173) facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the engine parameter monitoring circuit 174, the generator load monitoring circuit 176, the comparison circuit 178 and the response management circuitry 180 are embodied as hardware units, such as electronic control units. As such, the engine parameter monitoring circuit 174, the generator load monitoring circuit 176, the comparison circuit 178 and the response management circuitry 180 may be embodied as one or more circuitry components including, but not limited to, processing circuitry, network interfaces, peripheral devices, input devices, output devices, sensors, etc. In some embodiments, the engine parameter monitoring circuit 174, the generator load monitoring circuit 176, the comparison circuit 178 and the response management circuitry 180 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the engine parameter monitoring circuit 174, the generator load monitoring circuit 176, the comparison circuit 178 and the response management circuitry 180 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

Thus, the engine parameter monitoring circuit 174, the generator load monitoring circuit 176, the comparison circuit 178, and/or the response management circuitry 180 may also include programmable hardware devices such as field programmable gate arrays, programmable array logic, programmable logic devices or the like. In this regard, the engine parameter monitoring circuit 174, the generator load monitoring circuit 176, the comparison circuit 178 and the response management circuitry 180 may include one or more memory devices for storing instructions that are executable by the processor(s) of the engine parameter monitoring circuit 174, the generator load monitoring circuit 176, the comparison circuit 178, and the response management circuitry 180. The one or more memory devices and processor(s) may have the same definition as provided below with respect to the memory 173 and the processor 172.

In the example shown, the controller 170 includes the processing circuit 171 having the processor 172 and the memory 173. The processing circuit 171 may be structured or configured to execute or implement the instructions, commands, and/or control processes described herein with respect the engine parameter monitoring circuit 174, the generator load monitoring circuit 176, the comparison circuit 178, and the response management circuitry 180. Thus, the depicted configuration represents the aforementioned arrangement where the engine parameter monitoring circuit 174, the generator load monitoring circuit 176, the comparison circuit 178, and the response management circuitry 180 are embodied as machine or computer-readable media. However, as mentioned above, this illustration is not meant to be limiting as the present disclosure contemplates other embodiments such as the aforementioned embodiment the engine parameter monitoring circuit 174, the generator load monitoring circuit 176, the comparison circuit 178, and the response management circuitry 180 are configured as a hardware unit. All such combinations and variations are intended to fall within the scope of the present disclosure.

The processor 172 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the engine parameter monitoring circuit 174, the generator load monitoring circuit 176, the comparison circuit 178, and the response management circuitry 180 may comprise or otherwise share the same processor which, in some example embodiments, may execute instructions stored, or otherwise accessed, via different areas of memory). Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 173 (e.g., RAM, ROM, Flash Memory, hard disk storage, etc.) may store data and/or computer code for facilitating the various processes described herein. The memory 173 may be communicably connected to the processor 172 to provide computer code or instructions to the processor 172 for executing at least some of the processes described herein. Moreover, the memory 173 may be or include tangible, non-transient volatile memory or non-volatile memory. Accordingly, the memory 173 may include database components, object code components, script components, or any other type of information structure for supporting the various activities and information structures described herein.

The communications interface 190 may include wireless interfaces (e.g., jacks, antennas, transmitters, receivers, transceivers, wire terminals, etc.) for conducting data communications with various systems, devices, or networks. For example, the communications interface 190 may include an Ethernet card and port for sending and receiving data via an Ethernet-based communications network and/or a Wi-Fi transceiver for communicating with engine 110, the generator 120, and optionally, the power source 130, and/or the load 140. The communications interface 190 may be structured to communicate via local area networks or wide area networks (e.g., the Internet, etc.) and may use a variety of communications protocols (e.g., IP, LON, Bluetooth, Zig-Bee, radio, cellular, near field communication, etc.).

The engine parameter monitoring circuit 174 is configured to receive engine operating parameter signals (e.g., data, values, information, etc.) from the engine 110 indicative of the engine operating parameter and determine the engine operating parameter value therefrom. For example, the engine parameter monitoring circuit 174 may be coupled to a speed sensor or a tachometer coupled to the engine 110 and configured to receive and interpret the engine operating parameter signals therefrom, the engine operating parameter signals being indicative of the speed of the engine 110.

The generator load monitoring circuit 176 is configured to receive load signals (e.g., data, values, information, etc.) from the generator 120 indicative of the load demand exerted by the generator 120 on the engine 110, and determine the load demand value therefrom. For example, a load sensor may be coupled to the generator 120 and configured to measure a power (i.e., the load demand) exerted by the generator 120 on the engine 110 (e.g., by measuring a current amplitude and phase difference between voltage and current at an output of the generator 120). The generator load monitoring circuit 176 may be coupled to the load sensor and configured to receive and interpret the load signals so as to determine the power demanded by the generator 120 from the engine 110.

The comparison circuit 178 is configured to compare the engine operating parameter value (e.g., an engine speed, torque or power) to the load demand value corresponding to the load demand (e.g., a power). Furthermore, the comparison circuit 178 may determine that the engine operating parameter value fails to match the load demand value, as previously described herein.

The response management circuitry 180 is structured to instruct the engine 110 to adjust the engine operating parameter value so as to match or substantially match the load demand value as the load demand value changes over time. Furthermore, the response management circuitry 180 may be configured to dynamically determine the engine operating parameter threshold value corresponding to a load demand value exerted by the generator 120 on the engine 110 at which the engine 110 starts to stall, and set the value as a maximum allowable engine operating parameter value.

Expanding further, in response to determining that the engine operating parameter value fails to match the load demand value, the engine parameter control circuit 182 may determine an engine operating parameter threshold value corresponding to the load demand value at which the engine parameter value failed to match the load demand value. Furthermore, the engine parameter control circuit 182 may set the engine operating parameter threshold value as a maximum allowable engine operating parameter value for the engine 110, as previously described herein. The engine parameter control circuit 182 may also be configured to maintain the engine operating parameter value below the engine operating parameter value threshold, so as to prevent stalling or lugging of the engine 110.

In other embodiments, in response to the determining that the engine operating parameter value failed to match the load demand value, the generator load control circuit 184 may determine a load demand threshold value corresponding to the engine operating parameter value at which the engine parameter value failed to match the load demand value. The generator load control circuit 184 may set the engine operating parameter threshold value as a maximum allowable load demand value for the generator 120, as previously described herein. Moreover, the generator load control circuit 184 may also be configured to maintain the load demand value below the load demand threshold value, so as to prevent stalling or lugging of the engine 110.

Figure 3:
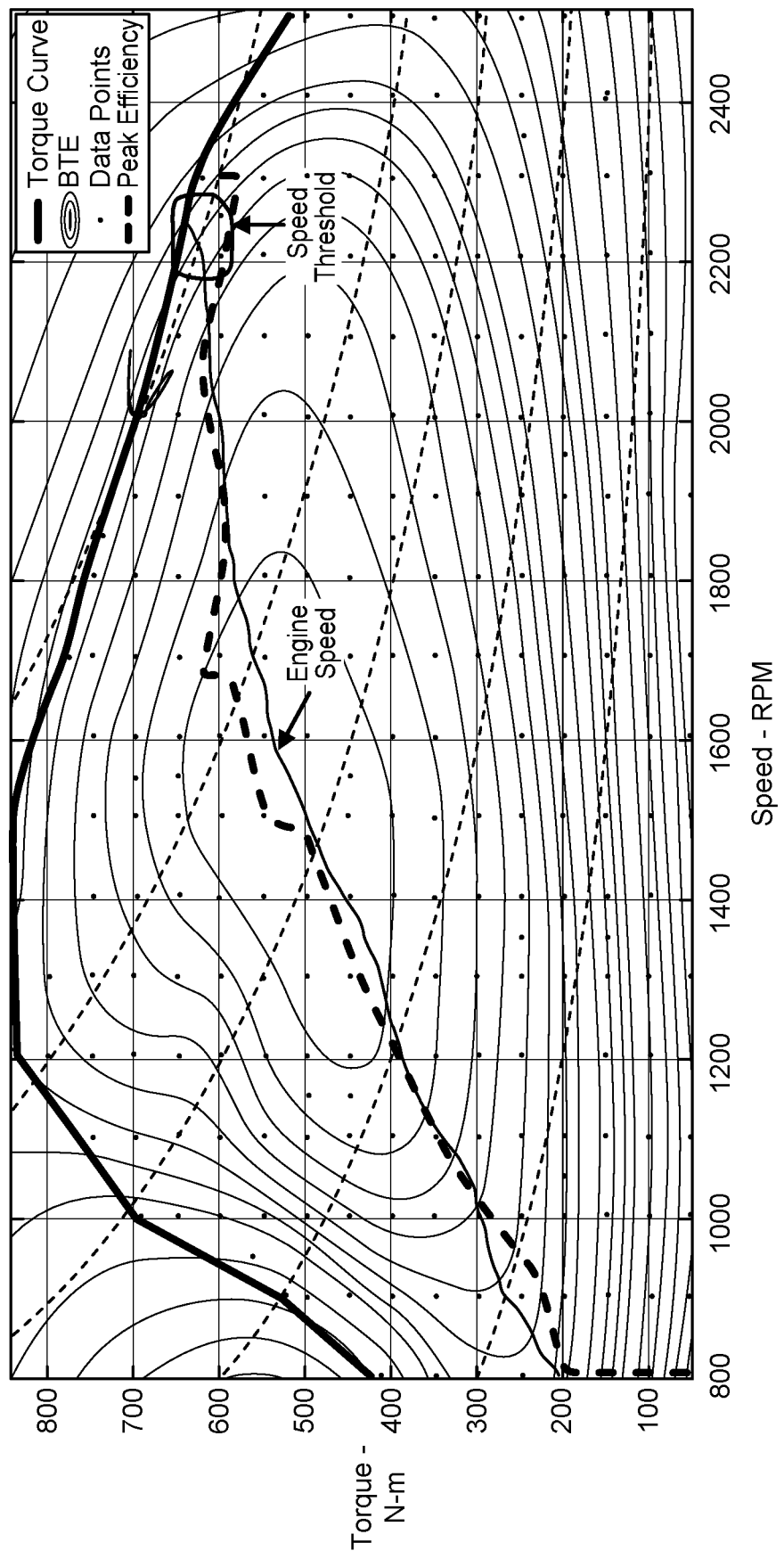
FIG. 3 is a torque-speed curve of an engine included in a genset in response to an increasing load demand exerted by the generator of the genset on the engine, and a speed threshold value of the engine.

FIG. 3 is an example speed-torque curve demonstrating the response of an engine coupled to a generator for use in a REEV. The speed of the engine is increased in response to an increasing load demand from the engine. The speed of the engine continues to increase until it reaches a speed threshold value, at which the engine is no longer able to match the load demand requested from the generator. Any further increase in a load demand value causes a decrease in the engine speed corresponding to the engine stalling or lugging, and may lead to engine shut down. The speed threshold value may be set (e.g., by a controller, such as the controller 170 coupled to the engine and the generator) as the maximum allowable speed value for the engine, and the engine speed may be maintained below this value, for example by restricting the load demand, thereby preventing stalling or lugging of the engine while enabling maximum possible power draw from the engine.

Figure 4A:
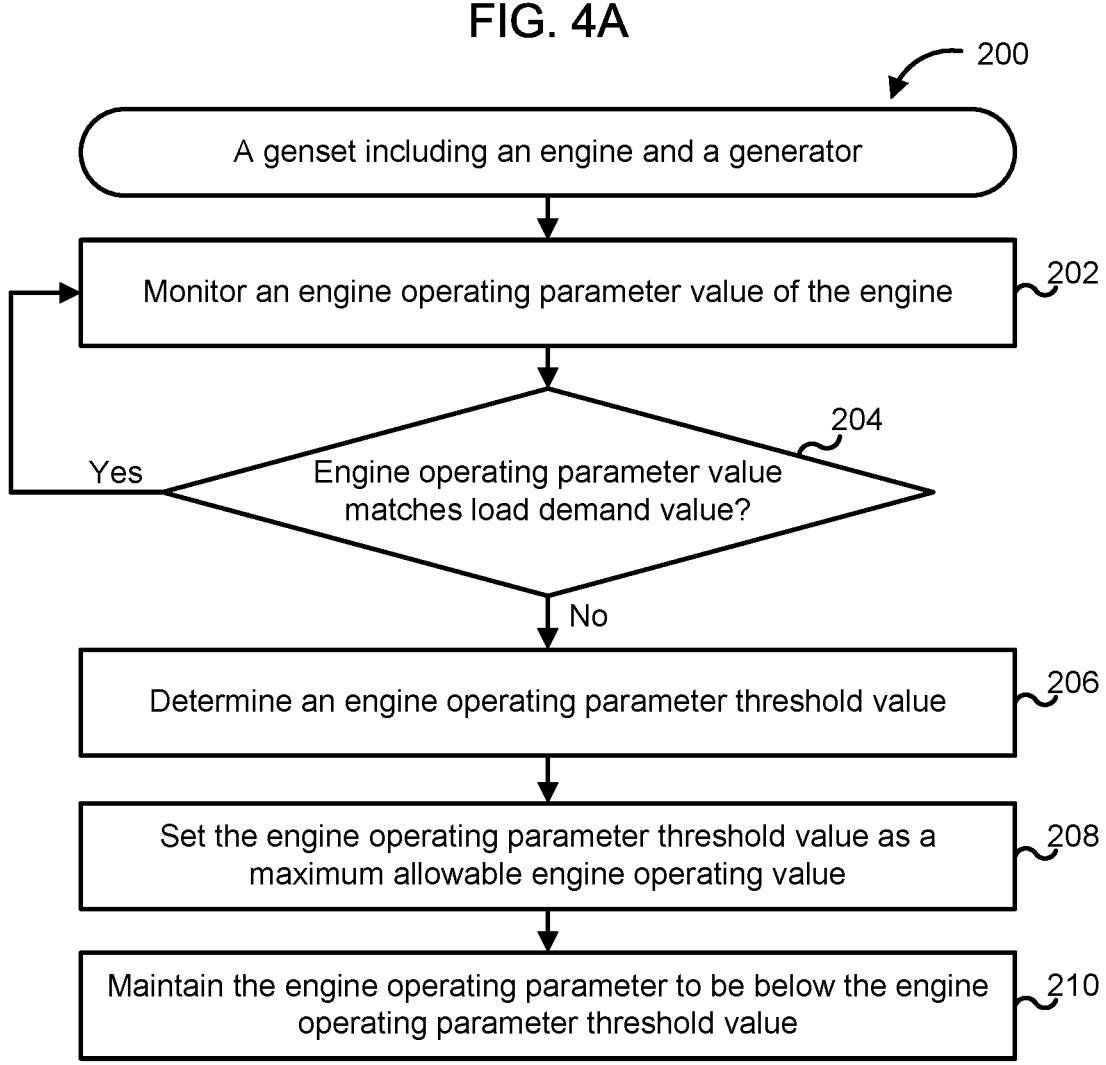
FIG. 4A is a schematic flow diagram of a method for determining an engine operating parameter threshold value for an engine included in a genset, and setting the value as a maximum allowable engine operating parameter value for the engine, according to an embodiment.

FIG. 4A is a schematic flow diagram of an example method 200 for preventing stalling and lugging in an engine (e.g., the engine 110) coupled to a generator (e.g., the generator 120) included in a genset (e.g., the genset 101) and allowing maximum power to be drawn from the engine. The engine may be mismatched from the generator, at least at certain operating conditions. While described with respect to the system 100 and the genset 101, the operations of the method 200 are application to any number of gensets included in any system, for example a hybrid vehicle, a plug-in-hybrid vehicle, a REEV or any other system which includes a genset. As such the operations of the method 200 may be implemented with the engine 110, the generator 120 and the controller 170, and are therefore described with respect to FIGS. 1-2.

In some embodiments, the engine parameter monitoring circuit 174 monitors an engine operating parameter value of the engine 110, at 202. For example, the engine parameter monitoring circuit 174 may be configured to receive engine operating parameter signals from the engine 110 (e.g., from a speed sensor, load sensor or tachometer coupled thereto) indicative of the engine operating parameter and determine the engine operating parameter value therefrom.

The comparison circuit 178 determines if the engine operating parameter value matches the load demand value, at 204. For example, the comparison circuit 178 may be configured to compare the engine operating parameter value (e.g., an engine speed, torque or power) to the load demand value corresponding to the load demand (e.g., a power) so as to determine if the engine operating parameter value matches the load demand value.

If the engine operating parameter value matches the load demand value, the comparison circuit 178 continues to compare the engine operating parameter value to the load demand value (e.g., the method 200 returns to operation 202). In response to determining that the engine operating parameter value fails to match the load demand value, the engine parameter control circuit 182 determines an engine operating parameter threshold value, at 206. For example, if the comparison circuit 178 determines that the engine operating parameter value fails to match the load demand value, the engine parameter control circuit 182 may determine the engine operating parameter threshold value corresponding to the load demand value at which the engine parameter value failed to match the load demand value.

The engine parameter control circuit 182 may set the engine operating parameter threshold value as a maximum allowable engine operating parameter value for the engine 110, at 208. Furthermore, the engine parameter control circuit 182 maintains the engine operating parameter value below the engine operating parameter value threshold, at 210, so as to prevent stalling or lugging of the engine 110.

Figure 4B:
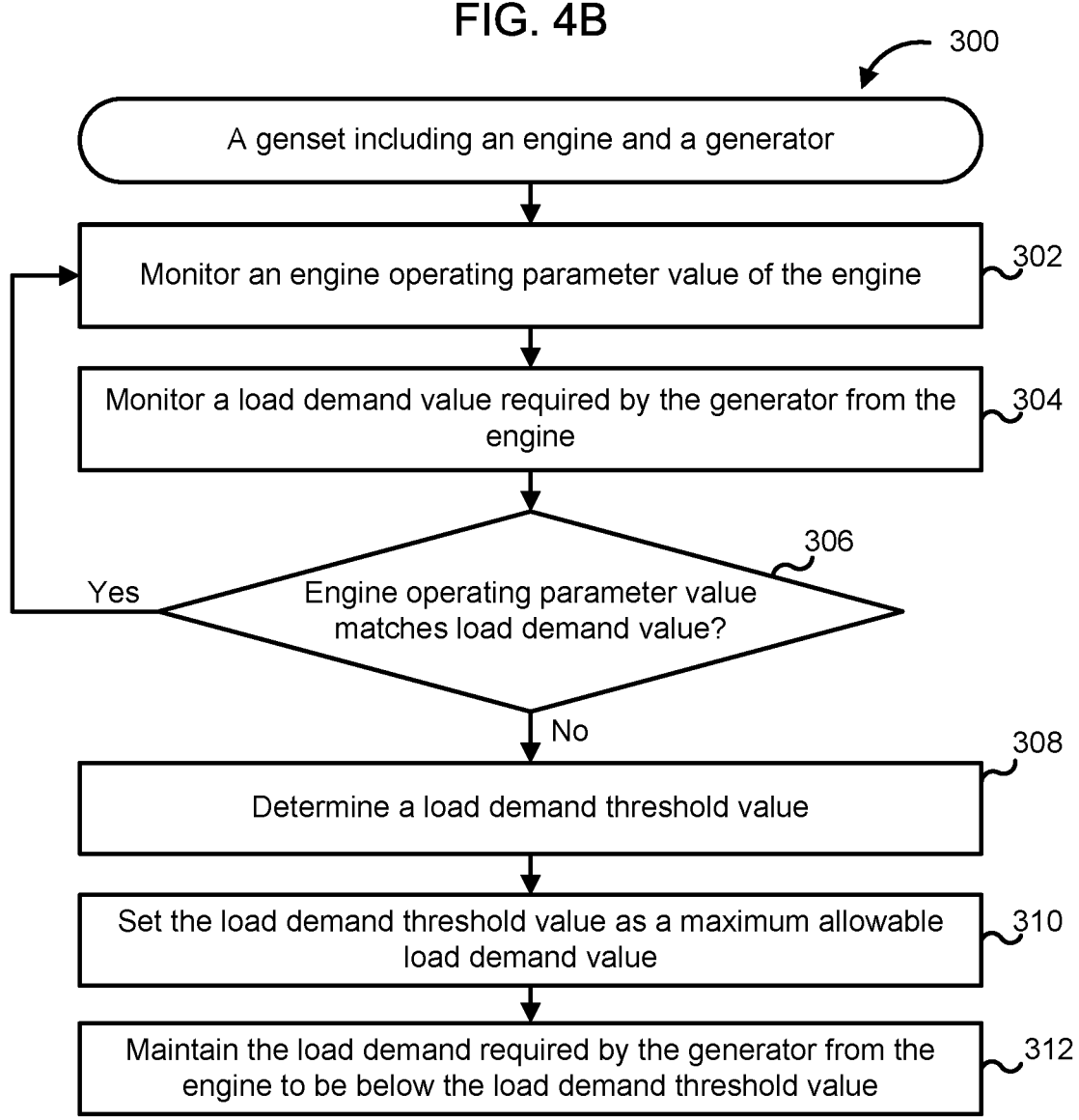
FIG. 4B is a schematic flow diagram of a method for determining a load demand threshold value for an engine included in a genset, and setting the value as a maximum allowable load demand value for the engine, according to an embodiment.

FIG. 4B is a schematic flow diagram of another example method 300 for preventing stalling and lugging in an engine (e.g., the engine 110) coupled to a generator (e.g., the generator 120) included in a genset (e.g., the genset 101) and allowing maximum power to be drawn from the engine. The engine may be mismatched from the generator, at least at certain operating conditions. While described with respect to the system 100 and the genset 101, the operations of the method 300 are application to any number of gensets included in any system, for example, a hybrid vehicle, a plug-in-hybrid vehicle, a REEV or any other system which includes a genset. As such the operations of the method 300 may be implemented with the engine 110, the generator 120 and the controller 170, and are therefore described with respect to FIGS. 1-2.

The engine parameter monitoring circuit 174 monitors an engine operating parameter value of the engine 110, at 302. For example, the engine parameter monitoring circuit 174 may be configured to receive engine operating parameter signals from the engine 110 (e.g., from a speed sensor, load sensor or tachometer coupled thereto) indicative of the engine operating parameter and determine the engine operating parameter value therefrom.

The generator load monitoring circuit 176 monitors a load demand value demanded by the generator 120 from the engine 110, at 304. For example, the generator load monitoring circuit 176 may be configured to receive load signals from the generator 120 (e.g., from a load sensor coupled thereto) indicative of the load demand exerted by the generator 120 on the engine 110, and determine the load demand value therefrom.

The comparison circuit 178 determines if the engine operating parameter value matches the load demand value, at 306. In response to the determining that the engine operating parameter value failed to match the load demand value, the generator load control circuit 184 may determine a load demand threshold value, at 308. The load demand value corresponds to the engine operating parameter value at which the engine parameter value fails to match the load demand value. The generator load control circuit 184 sets the engine operating parameter threshold value as a maximum allowable load demand value for the generator 120, at 310. Moreover, the generator load control circuit 184 also maintains the load demand value below the load demand threshold value, at 312 so as to prevent stalling or lugging of the engine 110. In various embodiments, the operations of methods 200 and 300 may be combined so that the engine operating parameter maybe maintained below the engine operating parameter threshold value, and the load demand maybe maintained below the load demand threshold value.

Although an example computing device has been described in FIG. 2, implementations described in this specification can be implemented in other types of digital electronic, or in computer software, firmware, or hardware, including the structures disclosed in this specification and their structural equivalents, or in combinations of one or more of them.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The term "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A system, comprising:
   a generator;
   an engine coupled to the generator, the engine configured to provide mechanical power to the generator; and
   a controller coupled to the engine and the generator, the controller configured to:
      compare an engine operating parameter value to a load demand value indicative of a load exerted by the generator on the engine,
      determine that the engine operating parameter value fails to match the load demand value,
      determine an engine operating parameter threshold value at which the engine operating parameter value failed to match the load demand value, and
      set the engine operating parameter threshold value as a maximum allowable engine operating parameter value for the engine.

2. The system of claim 1, wherein the controller is further configured to adjust the engine operating parameter value to match the load demand value as the load demand value changes over time.

3. The system of claim 1, wherein the controller is further configured to:
   maintain the engine operating parameter value below the engine operating parameter threshold value.

4. The system of claim 1, wherein the engine operating parameter value comprises at least one of an engine speed, an engine power or an engine torque.

5. The system of claim 1, wherein when the load demand value is greater than the engine operating parameter threshold value, the controller is configured to turn off the engine to prevent the engine from stalling.

6. The system of claim 1, wherein the controller is further configured to:
   determine a load demand threshold value corresponding to the engine operating parameter value at which the engine operating parameter value failed to match the load demand value, and
   set the load demand threshold value as a maximum allowable load demand value for the generator.

7. The system of claim 6, wherein the controller is further configured to:
   maintain the load demand value below the load demand threshold value.

8. The system of claim 1, wherein the engine is mismatched with the generator such that the engine has at least one of a peak torque, peak power or peak speed which is less than at least one of a peak torque, peak power or peak speed, respectively, of the generator.

9. A control system for a genset that includes an engine and a generator, the control system comprising:
   a controller configured to be coupled to each of the engine and the generator, the controller configured to:
      compare an engine operating parameter value to a load demand value indicative of a load exerted by the generator on the engine;
      determine that the engine operating parameter value fails to match the load demand value;
      determine an engine operating parameter threshold value at which the engine operating parameter value failed to match the load demand value; and
      set the engine operating parameter threshold value as a maximum allowable engine operating parameter value for the engine.

10. The control system of claim 9, wherein the controller is configured to adjust the engine operating parameter value so as to match the load demand value as the load demand value changes over time.

11. The control system of claim 9, wherein the controller is further configured to:
    maintain the engine operating parameter value below the engine operating parameter threshold value.

12. The control system of claim 9, wherein the engine operating parameter value comprises at least one of an engine speed, an engine power or an engine torque.

13. The control system of claim 9, wherein when the load demand value is greater than the engine operating parameter threshold value, the controller is configured to turn off the engine to prevent the engine from stalling.

14. The control system of claim 9, wherein the controller is further configured to:
    determine a load demand threshold value at which the engine operating parameter value failed to match the load demand value; and
    set the load demand threshold value as a maximum allowable load demand value for the generator.

15. The control system of claim 14, wherein the controller is further configured to:
    maintain the load demand value below the load demand threshold value.

16. A method for controlling a genset that includes an engine and a generator, comprising:
    comparing an engine operating parameter value to a load demand value indicative of a load exerted by the generator on the engine;
    determining that the engine operating parameter value fails to match the load demand value;
    determining an engine operating parameter threshold value at which the engine operating parameter value failed to match the load demand value; and
    setting the engine operating parameter threshold value as a maximum allowable engine operating parameter value for the engine.

17. The method of claim 16, further comprising adjusting the engine operating parameter value to match the load demand value as the load demand value changes over time.

18. The method of claim 16, further comprising:
    maintaining the engine operating parameter value below the engine operating parameter threshold value.

19. The method of claim 16, further comprising:
    determining a load demand threshold value corresponding to the engine operating parameter value at which the engine operating parameter value failed to match the load demand value; and
    setting the load demand threshold value as a maximum allowable load demand value for the generator.

20. The method of claim 19, further comprising:
    maintaining the load demand value below the load demand threshold value.

\* \* \* \* \*